(12) United States Patent
Kowalski

(10) Patent No.: US 7,408,998 B2
(45) Date of Patent: Aug. 5, 2008

(54) SYSTEM AND METHOD FOR ADAPTIVE BIT LOADING SOURCE CODING VIA VECTOR QUANTIZATION

(75) Inventor: John M. Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 150 days.

(21) Appl. No.: 10/906,837

(22) Filed: Mar. 8, 2005

(65) Prior Publication Data

US 2005/0195905 A1    Sep. 8, 2005

Related U.S. Application Data

(60) Provisional application No. 60/551,651, filed on Mar. 8, 2004.

(51) Int. Cl.
*H04L 27/28* (2006.01)
(52) U.S. Cl. .................................... 375/260
(58) Field of Classification Search ............... 375/260, 375/240.22, 240.03, 242, 245, 246, 251, 375/252, 254; 704/222; 382/253
See application file for complete search history.

(56) References Cited

U.S. PATENT DOCUMENTS

| | | | | |
|---|---|---|---|---|
| 6,134,273 | A * | 10/2000 | Wu et al. | 375/522 |
| 6,351,730 | B2 * | 2/2002 | Chen | 704/229 |
| 6,452,981 | B1 | 9/2002 | Raleigh et al. | |
| 6,779,146 | B1 * | 8/2004 | Jones et al. | 714/748 |
| 6,879,840 | B2 * | 4/2005 | Razavilar et al. | 455/522 |
| 7,139,305 | B2 * | 11/2006 | Gavnoudias et al. | 375/147 |
| 2002/0007273 | A1 * | 1/2002 | Chen | 704/229 |
| 2003/0072382 | A1 | 4/2003 | Raleigh et al. | |
| 2003/0097623 | A1 | 5/2003 | Razavilar et al. | |
| 2003/0161282 | A1 * | 8/2003 | Medvedev et al. | 370/329 |
| 2004/0203979 | A1 * | 10/2004 | Attar et al. | 455/522 |

OTHER PUBLICATIONS

Doufexi et al. Robust Wireless Image Transmission using Jointly-Optimized Modulation and Source Coding, 2000, IEEE, p. 2039-2043.*

Chang et al. Robust Zero-Redundancy Vector Quantization for Noisy channels 1989 IEEE, p. 1338-1342.*

(Continued)

*Primary Examiner*—Sam K Ahn
(74) *Attorney, Agent, or Firm*—Madson & Austin

(57) ABSTRACT

A communication system includes a data transmitter and a data receiver in which the data transmitter transmits data using a multicarrier modulation, such as an OFDM modulation technique. The data receiver determines a predetermined level of modulation for at least one carrier of the multicarrier modulation corresponding to a received signal-to-noise ratio for the carrier using a vector quantization technique. The predetermined level of modulation for each carrier is based on an index to a codeword in a codebook corresponding to the signal-to-noise ratio for the carrier. The index to the codeword is a nearest neighbor to a vector corresponding to the signal-to-noise ratio for the carrier, and the codeword for each predetermined level of modulation is determined based on an adaptive-bit-loading technique. The data receiver transmits the index to the codeword for each carrier to the data transmitter in order to update the modulation at the data transmitter.

18 Claims, 4 Drawing Sheets

OTHER PUBLICATIONS

Chow, Cioffi et al., "A Practical Discrete Multitone Transceiver Loading Algorithm for Data Transmission Over Spectrally Shaped Channels,"IEEE Trans. Comm. vol. 43, pp. 773-775, Feb.-Apr. 1995.

Bangerter, Jacobsen, et al., "High-Throughput Wireless LAN Air Interface," Intel ITI vol. 07, Issue 03, pp. 47-58, 2003.

Robert M. Gray, Vector Quantization, IEEE ASSP Magazine Apr. 1,2, 1984.

Linde, Buzo, and Gray, "An Algorithm for Vector Quantizer Design," IEEE Transactions on Communications, pp. 702-710, Jan. 1980.

Keller and Hanzo, "Adaptive Modulation Techniques for Duplex OFDM Transmission," IEEE Trans. Vehicular Tech. vol. 49. pp. 1893-1906, Sep. 2000.

* cited by examiner

SYSTEM AND METHOD FOR ADAPTIVE BIT LOADING SOURCE CODING VIA VECTOR QUANTIZATION

CROSS-REFERENCE TO RELATED PATENT APPLICATION

The present patent application is a non-provisional patent application of U.S. Provisional Patent Application Ser. No. 60/551,651, entitled "System and Method for Adaptive Bit Loading Source Coding via Vector Quantization," filed Mar. 8, 2004, invented by John M. Kowalski, and incorporated by reference herein.

BACKGROUND OF THE INVENTION

1. Field of the Invention

The present invention relates to communication systems. More particularly, the present invention relates to a system and method that provides an ABL-based modulation technique for a multicarrier communication system.

2. Description of the Related Art

In Orthogonal Frequency Division Multiplexing (OFDM) systems, a number of typically sinusoidal carriers are used for transmitting information. In legacy OFDM wireless LAN systems, all carriers have the same modulation. When a channel becomes too noisy, all carriers fall back to a simpler degree or level of modulation, thereby lowering the overall data rate that can be achieved. An Adaptive Bit Loading (ABL) modulation technique has been proposed that allows a more continuous rate fall back in order to increase throughput in colored-noise environments. ABL modulation basically provides carriers having a low signal-to-noise ratio (SNR) with a simpler modulation (or the carrier is not transmitted at all), and carriers having a high SNR with a higher complexity modulation. That is, the modulator changes the number of bits assigned to a given symbol based on the channel conditions while meeting the required target bit error rate (BER) at the receiver. Accordingly, more data can be sent when the channel conditions are good and less data will be sent when channel conditions are poor while still meeting the target BER.

ABL has been utilized in, for example, Digital Subscriber Line (DSL) systems. DSL channels, however, are typically rather benign relative to wireless channels in that the DSL environment does not change rapidly. For additional details regarding ABL, see, for example, Chow et al., "A Practical Discrete Multitone Transceiver Loading Algorithm for Data Transmission over Spectrally Shaped Channels," IEEE Trans. Comm. Vol. 43, pp. 773-775, 1995.

One problem with ABL for OFDM, such as is used in 802.11a, in which 48 carriers and seven modulations are used and that a simplistic ABL coding would have a significant impact on throughput because the information fed back would include approximately $3^{48}$ bits. The channel, however, contains much redundancy and it is unlikely that the highest SNR signals and the lowest SNR signals would alternate within the channel.

U.S. Patent Application Publication No. 2003/0072382 A1 discloses source-trellis coding for achieving data compression. Simple trellis coding is not adaptive and can be computationally complex. In particular, the trellis coding technique disclosed in U.S. Patent Application Publication No. 2003/0072382 A1 finds the "optimal" ABL constellation vector. After the optimal ABL constellation vector has been found, the ABL constellation vector is then trellis source coded. The term "ABL vector" as used herein denotes an $N_{carrier}$ symbol sequence. Each symbol represents a particular modulation on a given carrier and there are N carriers per OFDM symbol. For 802.11a, $N_{carrier}=48$. The symbols in the ABL vector take on values from an alphabet $\{a_1, a_2, \ldots, a_{number\ of\ modulations}\}$. Thus, the modulation that is to be used in j-th symbol is $a_j$. In 802.11a, the number of modulations is 8. In actuality, ABL implementations need not be optimal and reducing complexity of the operation of determining an ABL constellation vector is critical because the complexity of the operation directly affects the complexity of the receiver.

Consequently, what is needed is a source-coded ABL-based technique for a multicarrier communication system that having a reduced computational complexity and interoperatively scales between a complex implementation and an implementation that uses a minimal form of an ABL-based multicarrier modulation technique or uses no ABL-based modulation technique.

BRIEF SUMMARY OF THE INVENTION

The present invention provides a source-coded ABL-based technique for a multicarrier communication system that having a reduced computational complexity and is interoperatively scale between a complex implementation and an implementation that uses a minimal form of an ABL-based multicarrier modulation technique or uses no ABL-based modulation technique.

The present invention provides a communication system having a data transmitter and a data receiver. The data transmitter transmits data using a multicarrier modulation, such as an OFDM modulation technique. The data receiver determines a predetermined level of modulation for at least one carrier of the multicarrier modulation corresponding to a received signal-to-noise ratio for the carrier using a vector quantization technique. According to the present invention, the predetermined level of modulation for each carrier is based on an index to a codeword in a codebook corresponding to the signal-to-noise ratio for the carrier. The index to the codeword is a nearest neighbor to a vector corresponding to the signal-to-noise ratio for the carrier, and the codeword for each predetermined level of modulation is determined based on an adaptive-bit-loading technique. The data receiver transmits the index to the codeword for each carrier to the data transmitter.

The present invention also provides a receiver in a multicarrier modulation system, such as an OFDM modulation system, that includes an estimator and a vector quantizer. The estimater estimates a received signal-to-noise ratio for at least one carrier of the multicarrier modulation system for data received from a data transmitter. The vector quantizer determines a predetermined level of modulation for each carrier of the multicarrier modulation based on the received signal-to-noise ratio for the carrier using a vector quantization technique. The predetermined level of modulation for each carrier is based on an index to a codeword in a codebook corresponding to the signal-to-noise ratio for the carrier. The index to the codeword is a nearest neighbor to a vector corresponding to the signal-to-noise ratio for the carrier, and the codeword for each predetermined level of modulation is determined based on an adaptive-bit-loading technique. The receiver also includes a transmitter that transmits the index to the codeword for each carrier to the data transmitter.

The present invention provides a method for multicarrier-modulation technique, such as an OFDM modulation technique, in which a received signal-to-noise ratio is estimated for at least one carrier of a multicarrier-modulation signal for data received from a data transmitter, and a predetermined level of modulation is determined for each carrier of the multicarrier modulation based on the received signal-to-noise ratio for the carrier using a vector quantization technique. An index to a codeword in a codebook is determined based on the received signal-to-noise ratio for each carrier of the multicarrier modulation, such that the codeword represents the predetermined level of modulation for the carrier. The index to the codeword is a nearest neighbor to a vector corresponding to the signal-to-noise ratio for the carrier. The codeword for each predetermined level of modulation is determined based on an adaptive-bit-loading technique. The index to the codeword for each carrier is transmitted to the data transmitter.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a vector-quantization-based technique for source coding Adaptive Bit Loading (ABL) vectors. While vector-quantization-based techniques have been used mostly for image and speech processing (see for example, R. M. Gray, "Vector Quantization," IEEE ASSP Magazine 1, 2, April 1984), a vector-quantization-based technique has several advantages over simple trellis codes for achieving data compression. For example, codebooks can be arranged for minimizing computational complexity in comparison to trellis encoding, which is as computationally expensive as a Viterbi decoder. Further, codebooks can easily be made adaptive. Accordingly, as channel conditions change, the codebook can be changed using a simple frame-exchange sequence to periodically signal codebook updates. Further still, a vector-quantization-based technique can also achieve a scalable solution for adaptive bit loading by varying the codebook description and code signaling. Thus, the present invention provides an ABL-based multicarrier modulation technique that can interoperatively scale between a complex implementation and an implementation that uses a minimal form of an ABL-based multicarrier modulation technique or uses no ABL-based modulation technique. Interoperability between variations of implementations could be guaranteed without additional signaling.

In particular, the present invention provides an ABL-based technique for multicarrier communication systems that uses two codebooks. One codebook is used for mapping a received SNR ABL vector into an index that is a "nearest neighbor" to the received SNR signal. The second codebook contains the modulation pattern (ABL vector) that is related to the same index. Accordingly, a separate ABL algorithm and a separate source-coding algorithm need not be performed. A training sequence can be used that is based on simulated data from idealized channel models (i.e., simulations or emulations of hardware) for training the ABL codebook.

Figure 1:
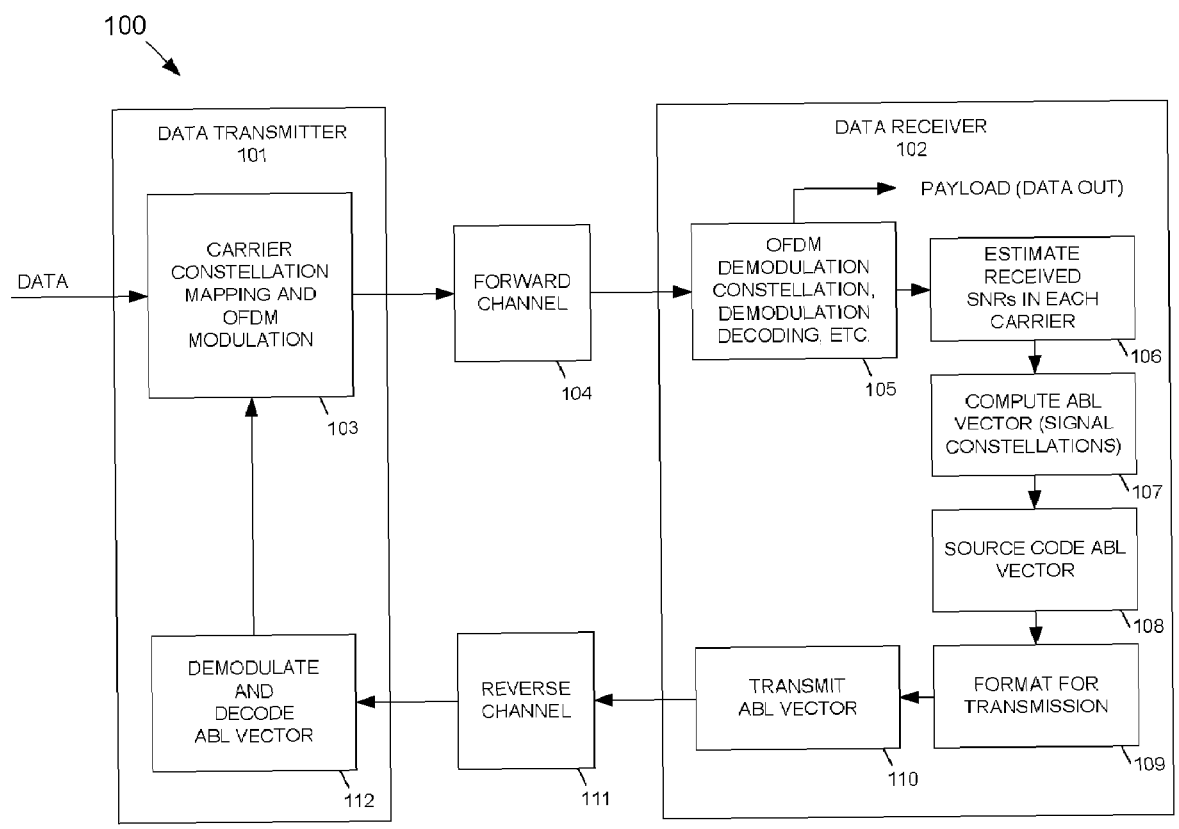
FIG. 1 depicts a functional block diagram of a transmitter and receiver system that utilizes a conventional Adaptive Bit Loading modulation technique.

FIG. 1 depicts a functional block diagram of a transmitter and receiver system 100 that utilizes a conventional Adaptive Bit Loading modulation technique. Transmitter and receiver system 100 includes a data transmitter 101 and a data receiver 102. Data transmitter 101 transmits a payload of interest (i.e., DATA) and data receiver 102 receives the payload of interest and performs computations and transmissions needed for optimizing carrier signal constellations via Adaptive Bit Loading (ABL). In cellular telephony and wireless LAN applications, a transmit and receive operation is typically a duplex operation; consequently, conventional ABL algorithms would be implemented at both data transmitter 101 and data receiver 102.

At data transmitter 101, channel-coded DATA is OFDM modulated at 103 and transmitted over a forward channel 104. At data receiver 102, the data is demodulated and decoded in a well-known manner at 105. The SNRs for each carrier is estimated in a well-known manner at 106, and an ABL vector is computed that provides the constellation that is to be used by the transmitter for each carrier is computed in a well-known manner at 107. The ABL vector is source coded in a well-known manner at 108, formatted for transmission in a well-known manner at 109, and transmitted at 110 over a reverse channel 111. At data transmitter 101, the ABL vector information is demodulated and decoded in a well-known manner at 112, and used for determining the signal constellation that should to be used for subsequent OFDM transmissions.

Figure 2:
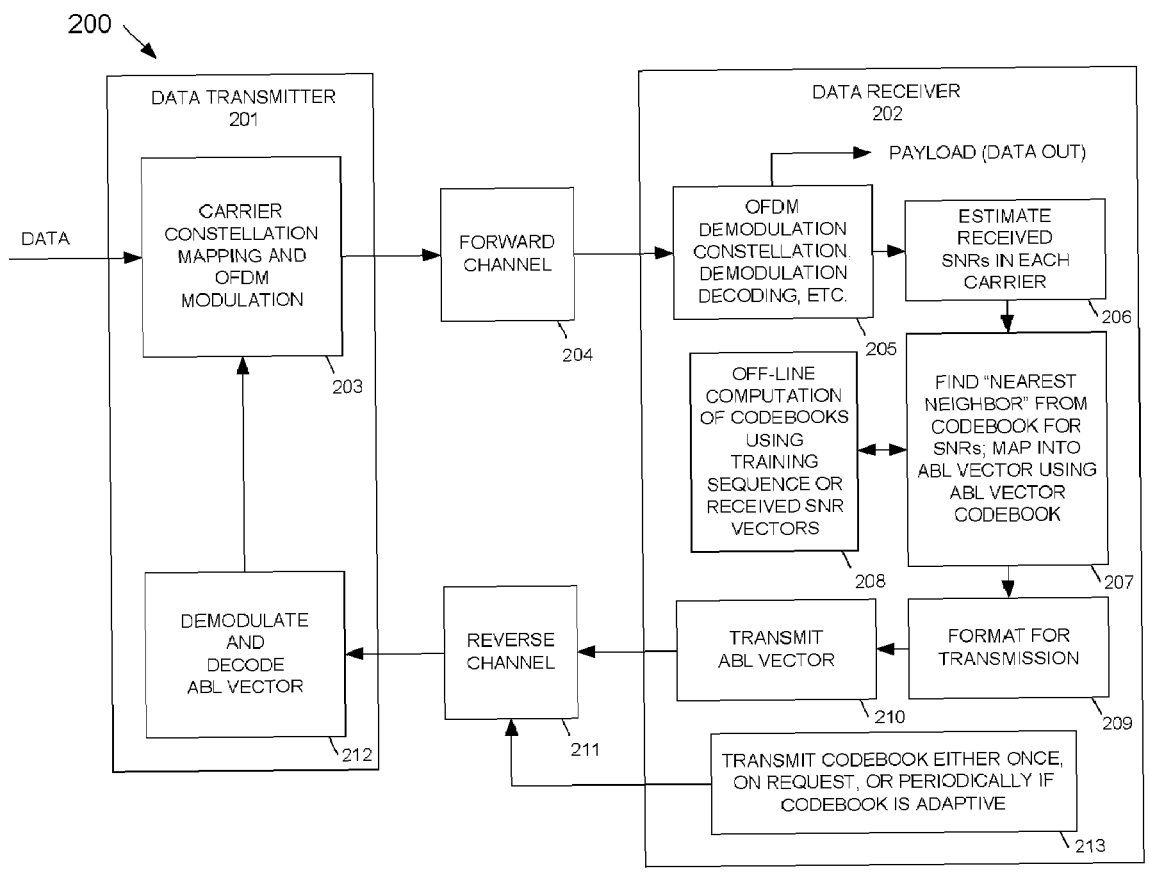
FIG. 2 depicts a functional block diagram of a transmitter and receiver system that utilizes an Adaptive Bit Loading modulation technique according to the present invention.

In contrast to FIG. 1, FIG. 2 depicts a functional block diagram of a transmitter and receiver system 200 that utilizes an Adaptive Bit Loading modulation technique according to the present invention. Transmitter and receiver system 200 includes a data transmitter 201 and a data receiver 202. Data transmitter 201 transmits a payload of interest (i.e., DATA) and data receiver 202 receives the payload of interest and performs computations and transmissions needed for optimizing carrier signal constellations using an ABL-based modulation technique according to the present invention.

At data transmitter 201, channel-coded DATA is OFDM modulated at 203 and transmitted over a forward channel 204. While the modulation is described as being OFDM, the ABL-based modulation technique of the present invention is applicable to any multicarrier modulation in which ABL-based modulation can be utilized. At data receiver 202, the data is demodulated and decoded in a well-known manner at 205. The SNRs for each carrier is estimated in a well-known manner at 206.

At 207, the present invention utilizes a vector-quantization-based technique for determining the "nearest neighbor" from a codebook for received SNRs and for achieving ABL map compression. Thus, the present invention combines the ABL determination process and quantization process into a single operation by making an implicit correspondence between a codebook based on received signal-to-noise ratios and a modulation pattern, or degree or level of modulation. Vector-quantization-based techniques map vectors into "representation vectors" contained in a codebook based on a minimization of a selected metric. Accordingly, the index from the codebook for a representation vector is then used for representing the original vector. For example, a vector quantizer can be designed that performs a "nearest neighbor" match for a received SNR vector s and determines a corresponding transmission vector $s_k$ that best represents the received SNR vector s, in which k denotes the k-th word of a K-word codebook. A received SNR vector would be an $N_{car}$-

$_{rier}$-tuple representing the received SNRs on previously received OFDM symbols. In one exemplary embodiment, the vector-quantization-based technique of the present invention determines the "nearest neighbor" to a codebook or table of SNRs based on some measure or metric, such as a Euclidean-based technique, a Kullback-Leibler information theoretic measure technique, etc. The table of SNRs is isomorphic to a table of ABL vectors.

Vector $s_k$ can be mapped into an ABL vector $\alpha_k$ that represents the specific modulation that is to be used for the corresponding carrier by using an ABL-based technique, such as disclosed by Chow et al., supra, or a similar algorithm. Computations of ABL vectors are not required to be performed in real time, as indicated at block 208 in FIG. 2, because the ABL vectors are stored for the codewords only, not the received SNR vectors. It should be understood that although a vector-quantization-based technique has been disclosed as being particularly useful for determining the "nearest neighbor" from a codebook for received SNRs and for achieving ABL map compression, other source-coding techniques might alternatively be used.

Returning to FIG. 2, the index of each codeword is formatted for transmission at block 209 and is transmitted at 210 to data transmitter 201 over a reverse channel 211. At data transmitter 201, the ABL vector information of the present invention is demodulated and decoded in a well-known manner at 212, and used for determining the signal constellation that should to be used for subsequent OFDM transmissions.

Figure 3:
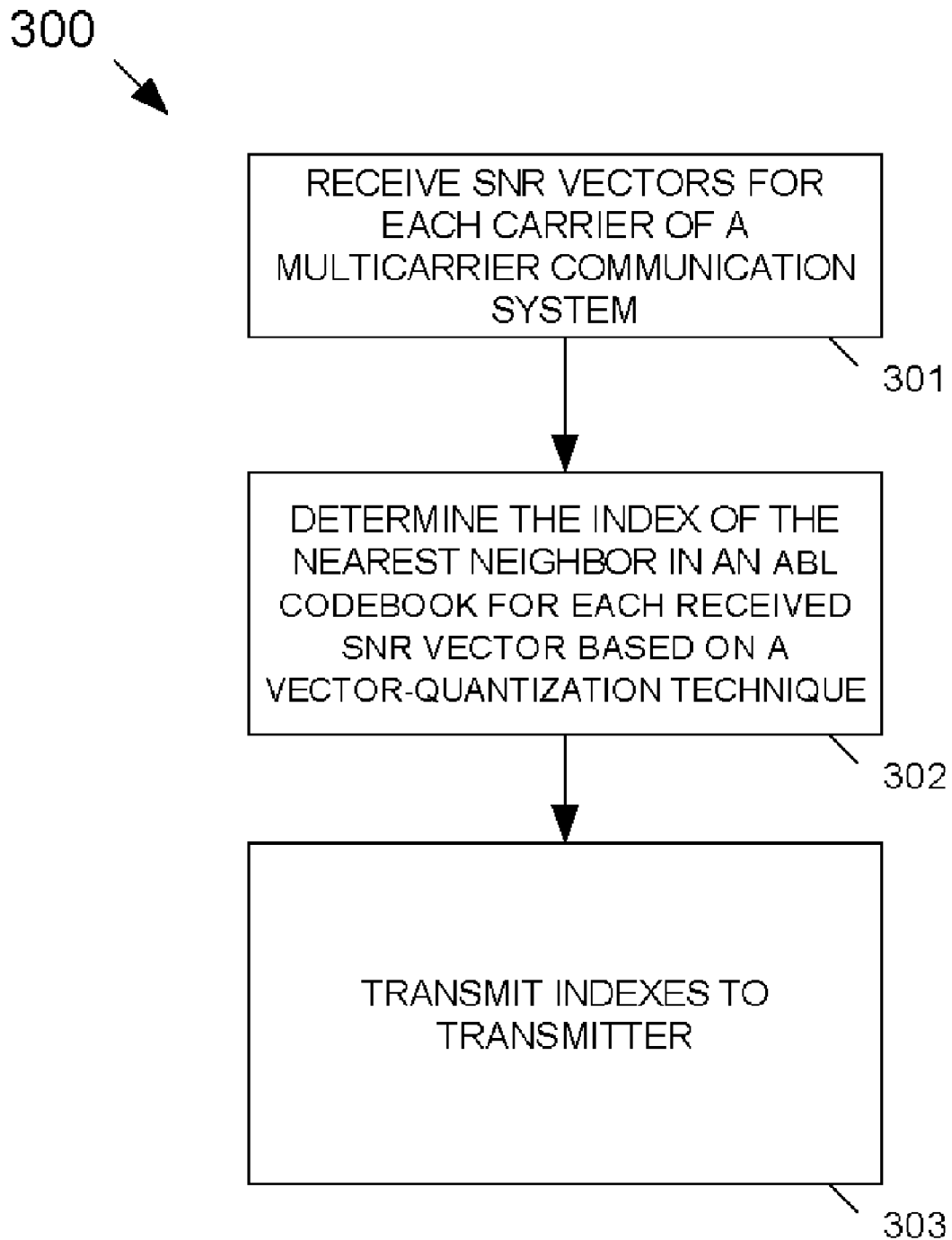
FIG. 3 depicts a flow diagram for a process for source coding ABL vectors using a vector-quantization-based technique according to the present invention.

FIG. 3 depicts a flow diagram for a process 300 for source coding ABL vectors using a vector-quantization-based technique according to the present invention. At step 301, SNR vectors are received for each carrier of a multicarrier communication system. At step 302, the index of a nearest neighbor in an ABL codebook is determined for each received SNR vector based on a vector-quantization-based technique. At step 303, the indexes for each carrier are transmitted to the transmitter of the multicarrier communication system in order to update the modulation technique of the transmitter. Steps 301 through 303 are periodically repeated or repeated as necessary for adapting the modulation of the multicarrier communication system to the conditions of a channel.

The system of the present invention could be simulated (with or without ABL) for culling a "training set" of received SNR vectors. From a distribution of received SNR vectors, an algorithm, such as the Lloyd-Max Algorithm, could be used for finding the codebook, or table, that "best represents" the received SNR training set in a minimum distortion sense. For details regarding the Lloyd-Max Algorithm, see, for example, Linde et al., "An Algorithm for Vector Quantizer Design," IEEE Transactions on Communications, pp. 702-710, January 1980.

Figure 4:
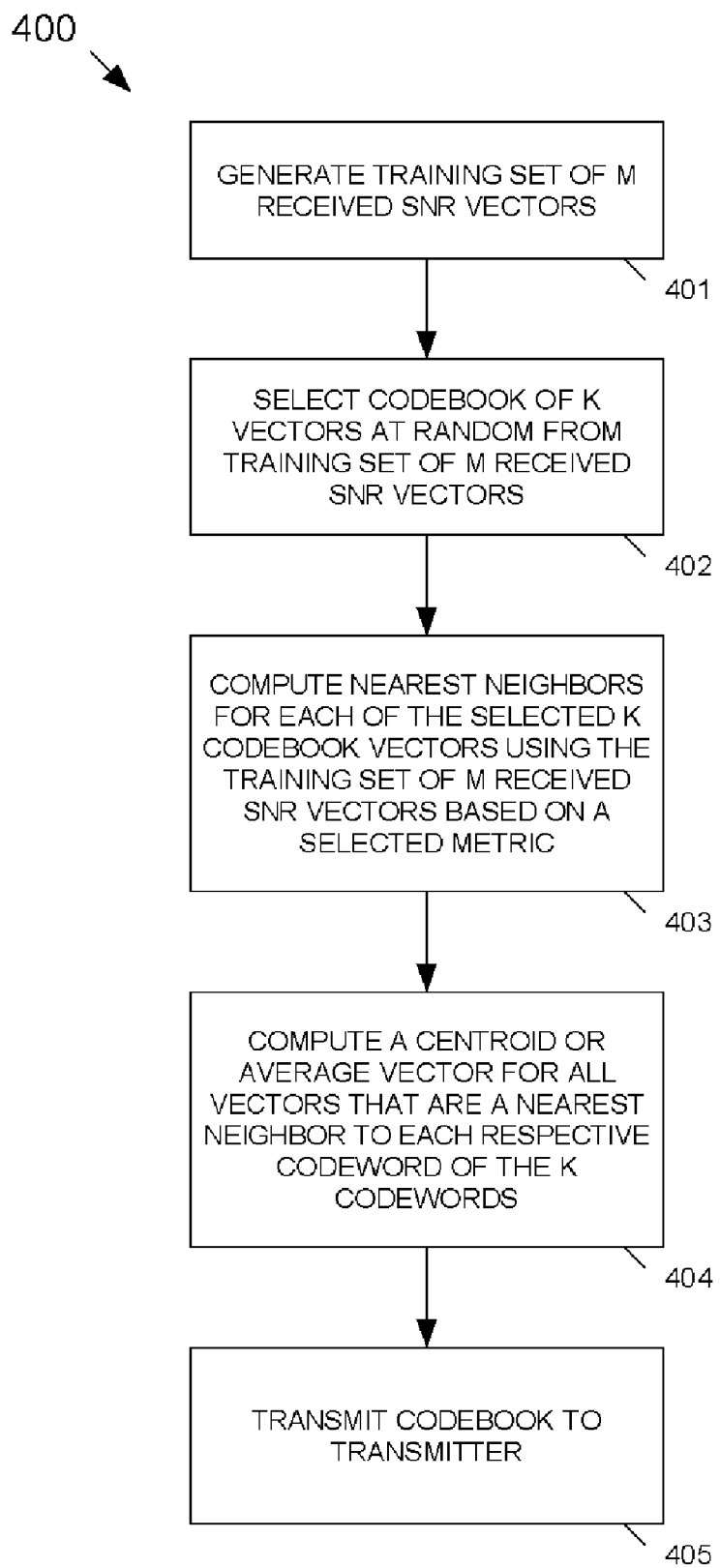
FIG. 4 depicts a flow diagram for a process for training a codebook based on simulated data from idealized channel model and for adaptively updating according to the present invention.

FIG. 4 depicts a flow diagram for a process 400 for training a codebook based on simulated data from idealized channel model and for adaptively updating according to the present invention. At step 401, a training set of M received SNR vectors are simulated or generated based on, for example, simulations or emulations of system hardware. The received SNR training set is selected to be sufficiently large in order to represent the underlying SNR vector distribution. Details of selecting a sufficiently large SNR training set are well known and will not be discussed in detail here suffice it to say that stochastic data or training data is generated to train a codebook for performing source coding on the SNR vector. At step 402, an initial codebook of K vectors are selected at random from the SNR training set such that K<<M. 2. At step 403, the nearest neighbors are computed for each of the selected K codebook vectors using the training set of M received SNR vectors based on a selected metric. For example, the Kullback-Leibler information measure is often used for speech compression. Alternatively, nearest neighbors for each of the initial K codebook vectors could be computed based on, for example, a Euclidean-based metric or an $L^n$-based metric. At step 404, for all vectors that are a nearest neighbor to each respective codeword of the K codewords, a centroid or average vector is computed based on the selected metric. The computed centroid vector then becomes the new codeword. At step 405, the trained codebook containing the new codewords is transmitted to the transmitter.

The codebook can be adaptively updated by periodically repeating the training process described in connection with steps 401 through 404, except an ABL-based algorithm, such as the ABL-based algorithm disclosed by Chow et al., supra, is performed on the codebook after the codebook has been created at step 404 before transmission at step 405. As previously described, computations of ABL vectors are not required to be performed in real time and can be performed off-line, as indicated at block 208 in FIG. 2. An updated codebook would be transmitted at step 405.

The present invention also provides an encoding technique that provides a scalable implementation of ABL by varying the description of the codebook. In particular, it is desirable to have low-cost, low performance, yet interoperable versions of 802.11n that either use a very minimal form of ABL or use no ABL at all. In either case, the codebook can be very coarsely designed, such as when, for example, two or three carriers have the same modulation at the same time. For example, to implement legacy designs, which only use a gross rate fall-back scheme, a codebook would be designed having codewords specifying SNRs at which rate fall-backs occur. The nearest neighbor would then set the data rate for all carriers. Other techniques may also be used. For example, codebooks could be used that group n-adjacent carriers having the same SNR and/or fall back groups of carriers. Thus, a scalable solution may be achieved that is fully interoperable with more advanced ABL systems.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A communication system, comprising,
    a data transmitter transmitting data using a multicarrier modulation; and
    a data receiver determining a predetermined level of modulation for at least one carrier of the multicarrier modulation corresponding to a received signal-to-noise ratio for the carrier using a vector quantization technique, wherein the vector quantization technique maps a vector corresponding to the received signal-to-noise ratio into a representation vector.

2. The communication system according to claim 1, wherein the data receiver determines the predetermined level of modulation for each carrier further based on an index to a codeword in a codebook corresponding to the signal-to-noise ratio for the carrier.

3. The communication system according to claim 2, wherein the index to the codeword is a nearest neighbor to a vector corresponding to the signal-to-noise ratio for the carrier.

4. The communication system according to claim 3, wherein the codeword for each predetermined level of modulation is determined based on an adaptive-bit-loading technique.

5. The communication system according to claim 1, wherein the data receiver transmits the index to the codeword for each carrier to the data transmitter.

6. The communication system according to claim 1, wherein the multicarrier modulation is based on an Orthogonal Frequency Division Multiplexing (OFDM) modulation technique.

7. A receiver in a multicarrier modulation system, comprising,
  an estimator estimating a received signal-to-noise ratio for at least one carrier of the multicarrier modulation system for data received from a data transmitter; and
  a vector quantizer determining a predetermined level of modulation for each carrier of the multicarrier modulation based on the received signal-to-noise ratio for the carrier using a vector quantization technique, wherein the vector quantization technique maps a vector corresponding to the received signal-to-noise ratio into a representation vector.

8. The receiver according to claim 7, wherein the predetermined level of modulation for each carrier is based on an index to a codeword in a codebook corresponding to the signal-to-noise ratio for the carrier.

9. The receiver according to claim 8, wherein the index to the codeword is a nearest neighbor to a vector corresponding to the signal-to-noise ratio for the carrier.

10. The receiver according to claim 9, wherein the codeword for each predetermined level of modulation is determined based on an adaptive-bit-loading technique.

11. The receiver according to claim 7, wherein the receiver further comprises a transmitter that transmits the index to the codeword for each carrier to the data transmitter.

12. The receiver according to claim 7, wherein the multicarrier modulation of the multicarrier modulation system is based on an Orthogonal Frequency Division Multiplexing (OFDM) modulation technique.

13. A multicarrier-modulation method, comprising,
  estimating a received signal-to-noise ratio for at least one carrier of a multicarrier-modulation signal for data received from a data transmitter; and
  determining a predetermined level of modulation for each carrier of the multicarrier modulation based on the received signal-to-noise ratio for the carrier using a vector quantization technique, wherein the vector quantization technique maps a vector corresponding to the received signal-to-noise ratio into a representation vector.

14. The method according to claim 13, further comprising determining an index to a codeword in a codebook based on the received signal-to-noise ratio for each carrier of the multicarrier modulation, the codeword representing the predetermined level of modulation for the carrier.

15. The method according to claim 14, wherein the index to the codeword is a nearest neighbor to a vector corresponding to the signal-to-noise ratio for the carrier.

16. The method according to claim 15, further comprising determining the codeword for each predetermined level of modulation based on an adaptive-bit-loading technique.

17. The method according to claim 15, further comprising transmitting the index to the codeword for each carrier to the data transmitter.

18. The method according to claim 13, wherein the multicarrier modulation is based on an Orthogonal Frequency Division Multiplexing (OFDM) modulation technique.

* * * * *